(12) United States Patent
Patterson et al.

(10) Patent No.: US 8,944,802 B2
(45) Date of Patent: Feb. 3, 2015

(54) FIXED PRINTHEAD FUSED FILAMENT FABRICATION PRINTER AND METHOD

(71) Applicants: Nathan James Patterson, Fitchburg, WI (US); Kevin Lee Harris, Lawton, OK (US)

(72) Inventors: Nathan James Patterson, Fitchburg, WI (US); Kevin Lee Harris, Lawton, OK (US)

(73) Assignee: Radiant Fabrication, Inc., Fitchburg, WI (US)

( * ) Notice: Subject to any disclaimer, the term of this patent is extended or adjusted under 35 U.S.C. 154(b) by 63 days.

(21) Appl. No.: 13/750,731

(22) Filed: Jan. 25, 2013

(65) Prior Publication Data

US 2014/0210137 A1    Jul. 31, 2014

(51) Int. Cl.
  B29C 47/30    (2006.01)
  B29C 67/02    (2006.01)
  B29C 47/02    (2006.01)
  B29C 67/00    (2006.01)
  B29C 47/08    (2006.01)

(52) U.S. Cl.
  CPC ........... B29C 47/025 (2013.01); B29C 67/0055 (2013.01); B29C 47/0866 (2013.01); B29C 67/0092 (2013.01)
  USPC ........................ 425/375; 264/308; 425/174

(58) Field of Classification Search
  CPC  B29C 47/025; B29C 47/065; B29C 47/0866; B29C 67/0055; B29C 67/0092
  USPC ............ 425/174, 375, 190; 264/308; 700/119
  See application file for complete search history.

(56) References Cited

U.S. PATENT DOCUMENTS

| | | | |
|---|---|---|---|
| 1,574,726 | A | 2/1926 | Bullard, Jr. |
| 1,671,354 | A | 5/1928 | DeLeeuw |
| 1,743,862 | A | 1/1930 | Morris |
| 2,393,696 | A | 1/1946 | Kraut et al. |
| 2,404,146 | A | 7/1946 | Scarff |
| 2,540,186 | A | 2/1951 | Bullard et al. |
| 2,965,208 | A | 12/1960 | Forster et al. |

(Continued)

FOREIGN PATENT DOCUMENTS

| | | |
|---|---|---|
| EP | 1262305 B1 | 6/2006 |
| EP | 2003954 A2 | 12/2008 |
| WO | 2009017739 A1 | 2/2009 |

OTHER PUBLICATIONS

All Metal" 1.75 Filament Rostock Delta Dual Extruder, Bowden, Reprap, 3D, found at <http://www.ebay.com/itm/ALL-METAL-1-75-FILAMENT-ROSTOCK-DELTA-DUAL-EXTRUDER-BOWDEN-REPRAP-3D-/181271173914>, accessed on Dec. 9, 2013.

(Continued)

Primary Examiner — Alison Hindenlang
Assistant Examiner — Emmanuel S Luk
(74) Attorney, Agent, or Firm — Stiennon & Stiennon

(57) ABSTRACT

A fused filament fabrication printer uses a plurality of fixed printing heads mounted to a structure over a build platform on which the model is built by constructing each layer of the model as the build platform is indexed through a multiplicity of successive print planes. The build platform may be in the form of a circular disk mounted for rotation about a z-axis and for linear motion along the z-axis between successive print planes, and for linear motion along a y-axis which is a selected radial direction perpendicular to the z-axis. Because the printheads are fixed, multiple printheads are easily affixed with respect to the build platform along the same radial line defining the y-axis transverse to the selected radial direction along which the build platform moves.

15 Claims, 4 Drawing Sheets

(56) References Cited

U.S. PATENT DOCUMENTS

| | | | |
|---|---|---|---|
| 3,498,772 | A | 3/1970 | Stalego |
| 3,574,040 | A * | 4/1971 | Chitwood et al. ............. 156/522 |
| 3,792,633 | A | 2/1974 | Filipiev et al. |
| 4,156,383 | A | 5/1979 | Maddox |
| 4,267,893 | A | 5/1981 | Mannon, Jr. |
| 4,341,502 | A | 7/1982 | Makino |
| 4,568,238 | A | 2/1986 | Hirano et al. |
| 4,575,330 | A | 3/1986 | Hull |
| 4,589,174 | A | 5/1986 | Allen |
| 4,594,670 | A | 6/1986 | Itoh |
| 4,648,785 | A | 3/1987 | Nakagawa et al. |
| 4,787,813 | A | 11/1988 | Stevens et al. |
| 5,121,329 | A | 6/1992 | Crump |
| 5,503,785 | A | 4/1996 | Crump et al. |
| 5,633,021 | A | 5/1997 | Brown et al. |
| 5,697,270 | A | 12/1997 | Link |
| 5,905,514 | A | 5/1999 | Rhoads et al. |
| 5,944,893 | A | 8/1999 | Anderson |
| 5,968,561 | A | 10/1999 | Batchelder et al. |
| 5,969,731 | A | 10/1999 | Michael et al. |
| 6,022,207 | A | 2/2000 | Dahlin et al. |
| 6,090,445 | A | 7/2000 | Anderson |
| 6,165,406 | A | 12/2000 | Jang et al. |
| 6,212,968 | B1 | 4/2001 | Hiruma et al. |
| 6,305,769 | B1 * | 10/2001 | Thayer et al. ..................... 347/1 |
| 6,508,971 | B2 * | 1/2003 | Leyden et al. ................ 264/401 |
| 6,532,394 | B1 | 3/2003 | Earl et al. |
| 6,813,822 | B2 | 11/2004 | Baldini et al. |
| 7,077,638 | B2 | 7/2006 | Leyden et al. |
| 7,137,182 | B2 * | 11/2006 | Nelson ........................... 29/428 |
| 7,591,536 | B2 | 9/2009 | Silverbrook |
| 7,604,470 | B2 | 10/2009 | LaBossiere et al. |
| 7,625,200 | B2 | 12/2009 | Leavitt |
| 7,726,761 | B2 | 6/2010 | Ishida |
| 7,833,001 | B2 | 11/2010 | Silverbrook |
| 7,942,987 | B2 * | 5/2011 | Crump et al. ................. 148/522 |
| 8,033,811 | B2 | 10/2011 | Swanson et al. |
| 8,222,908 | B2 | 7/2012 | Paul et al. |
| 8,226,395 | B2 | 7/2012 | Pax et al. |
| 8,252,223 | B2 * | 8/2012 | Medina et al. ................ 264/401 |
| 8,267,683 | B2 * | 9/2012 | Inoue ............................ 425/145 |
| 8,404,171 | B2 | 3/2013 | Heenan |
| 8,512,024 | B2 | 8/2013 | Pax |
| 8,540,501 | B2 * | 9/2013 | Yasukochi ...................... 425/89 |
| 8,578,995 | B2 * | 11/2013 | Nelson .......................... 156/433 |
| 8,778,252 | B2 * | 7/2014 | Mackie et al. ................ 264/308 |
| 2002/0008335 | A1 * | 1/2002 | Leyden et al. ................ 264/494 |
| 2004/0126452 | A1 | 7/2004 | Swanson et al. |
| 2004/0158343 | A1 * | 8/2004 | Hiatt et al. .................... 700/118 |
| 2004/0159967 | A1 * | 8/2004 | Farnworth ...................... 264/71 |
| 2004/0265413 | A1 * | 12/2004 | Russell et al. ................ 425/375 |
| 2005/0042320 | A1 * | 2/2005 | Hasei ............................ 425/375 |
| 2005/0110200 | A1 * | 5/2005 | Fong ............................. 264/494 |
| 2005/0280185 | A1 | 12/2005 | Russell et al. |
| 2006/0022379 | A1 * | 2/2006 | Wicker et al. ................. 264/255 |
| 2007/0090568 | A1 | 4/2007 | Teal et al. |
| 2007/0228590 | A1 | 10/2007 | LaBossiere et al. |
| 2009/0035405 | A1 | 2/2009 | Leavitt |
| 2009/0146341 | A1 * | 6/2009 | Hasselberg et al. ........... 264/219 |
| 2009/0179355 | A1 * | 7/2009 | Wicker et al. ................. 264/401 |
| 2010/0096072 | A1 | 4/2010 | Hopkins et al. |
| 2012/0018924 | A1 | 1/2012 | Swanson et al. |
| 2012/0068378 | A1 | 3/2012 | Swanson et al. |
| 2012/0164256 | A1 | 6/2012 | Swanson et al. |
| 2012/0189729 | A1 | 7/2012 | Pax |
| 2012/0237631 | A1 | 9/2012 | Jenko |
| 2012/0267813 | A1 | 10/2012 | Perret et al. |
| 2012/0286453 | A1 | 11/2012 | Pettis |
| 2012/0287459 | A1 | 11/2012 | Pettis |

OTHER PUBLICATIONS

RepRapWiki "RepOlaRap", Wikipedia, last modified on Jan. 29, 2011, website. Date of Access: Jan. 10, 2013. <http://reprap.org/wiki/RepOlaRap>.

BeagleFury, RepRap: Builders "Meet Ola, the RepolaRap (At least, her first parts)" posted Jan. 12, 2010, website. Date of Access: Jan. 10, 2013. <http://builders.reprap.org/2010/01/meet-ola-repolarap-at-least-her-first.html>.

BeagleFury "New direction on RepolaRap firmware" posted Feb. 1, 2010, website. Date of Access: Jan. 10, 2013. <http://forums.reprap.org/read.php?147,34720,34784,quote=1>.

Microcontroller Forum Tracker "Giving Sight to 'Ola'", website. Date of Access: Jan. 10, 2013. <http://www.microcodes.info/giving-sight-to-ola-119541.html>.

Cb4, adafruit support "rather awesome positioning system (R.A.P.S.)" Adafruit Industries, posted on Jun. 11, 2010 and Jun. 12, 2010, website. Date of access: Jan. 10, 2013. <http://www.adafruit.com/forums/viewtopic.php? f=31&p=80257>.

BeagleFury, RepRap: Builders "RepolaRap Calibration thoughts" posted on Jan. 14, 2010, website. Date of Access: Jan. 10, 2013. <http://builders.reprap.org/2010/01/repolarap-calibration-thoughts.html>.

BeagleFury, RepRap:Builders "RepolaRap Motor Mounted" posted on Jan. 17, 2010, website. Date of Access: Jan. 10, 2013. <http://builders.reprap.org/2010/01/repolarap-motor-mounted.html>.

BeagleFury, "RepolaRap Two Motor Test.mpg", uploaded Jan. 31, 2010, YouTube video. Date of Access: Jan. 24, 2013. <http://www.youtube.com/watch?v=UYO6RD787fM>.

BeagleFury, "RepolaRap_BuildPlatformMotor.mpg", uploaded Jan. 23, 2010, YouTube video. Date of Access: Jan. 24, 2013. <http://www.youtube.com/watch?v=uv8xSAuwKdY>.

Wolfgang Boehler, Andreas Marbs, "3D Scanning Instruments", i3mainz, Institute for Spatial Information and Surveying Technology, FH Mainz, University of Applied Sciences, Mainz, Germany. <i3mainz@geoinform.fh-mainz.de>, 2002.

Fausto Bernardini, Holly Rushmeier, "The 3D Model Acquisition Pipeline", Computer Graphics Forum, vol. 21 (2002), No. 2, pp. 149-172.

U.S. Patent Application Titled "Three-Dimensional Printing System Using Dual Rotation Axes", Unpublished (filed Jan. 20, 2012) (Mackie et al., applicants).

* cited by examiner

FIXED PRINTHEAD FUSED FILAMENT FABRICATION PRINTER AND METHOD

CROSS REFERENCES TO RELATED APPLICATIONS

Not applicable.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to extrusion-based 3-D printers, termed fused deposition modeling or fused filament fabrication printers, in general and more particularly to printers using a printhead which applies layers of thermoplastic (e. g. ABS, HDPE, PLA, PVA) to create models, prototypes, patterns, and production parts.

Fused filament fabrication works on an "additive" principle by laying down material in layers. This technique was initially developed by S. Scott Crump in 1989 and is described in U.S. Pat. No. 5,121,329. Initially such printers were extremely expensive, purchasable only by large companies, or accessible by outsourcing a 3-D model file to a fused filament fabrication printer or a competing technology, such as stereolithography as described in U.S. Pat. No. 4,575,330. Recent interest in fused filament fabrication has been increased by the development of consumer models of such printers of much lower cost. The development of low cost alternatives has been fueled by the expiration of U.S. Pat. No. 5,121,329 and the decreasing cost of high precision and reliable motors, motor controllers, and other key components required by fused filament fabrication printers.

A US patent application entitled Three-Dimensional Printing System Using Dual Rotating Axes to Thomas Mackey, Nathan Patterson, Benjamin Cox, Nathan Shoemaker, and George Petty, filed in 2012 (Mackey et al.) shows rotating build platform and rotary mounted printheads.

Fused filament fabrication, i.e. three-dimensional printing, in addition to providing three-dimensional models or parts for conceptual design studies also allows the manufacturing of functional items or tooling. Patterns for various metal and plastic casting technologies can also be formed. Typically, a plastic filament or metal wire is unwound from a coil and supplies material to an extrusion nozzle that can start and stop material flow. The nozzle is heated to melt the material and can be moved in both horizontal and vertical directions by a numerically controlled mechanism, directly controlled by a computer-aided manufacturing (CAM) software package. The model or part is produced by extruding small amounts of thermoplastic material to form layers as the material hardens immediately after extrusion from the nozzle. Tools for thermoforming and injection molding can be made, as well as fixtures which assist the manufacturing operation. In addition to providing for very low run manufacturing operations, art objects and display objects can be readily manufactured. Increasing the use of fused filament fabrication printers and printer consumables requires an increase in printing speed, multiple materials, and ideally lower printer costs.

SUMMARY OF THE INVENTION

The fused filament fabrication printer of this invention uses one or a plurality of fixed printing heads which are mounted to a structure under which a print or build platform is disposed. The build platform may be in the form of a circular disk mounted for rotation about a z-axis, for linear motion along a radial or y-axis direction perpendicular to the z-axis and for linear motion along the z-axis between successive print planes. The build platform is rotated and scanned in a radial direction to construct each layer of the model. The platform can be rotated by a stepper motor or a motor continuously to deposit arcs of extruded material or with varying speeds and directions to print fine details. The build platform is moved linearly to reposition the fixed extruders over the platform to print a complete layer. Because the printing heads are fixed, multiple printing heads are easily affixed with respect to the build platform. Printing heads using the same material enable parallel material deposition to increase printing speed, while heads using different materials permit the simultaneous deposition of those materials on the build platform. The final degree of freedom is provided by the stepper motors or motors moving the platform along the z-axis to move the build platform to the next print plane.

It is an object of the present invention to provide a fused filament fabrication printer of reduced cost and increased speed.

It is another object of the present invention to provide a fused filament fabrication printer which facilitates the use of multiple printheads which are simultaneously active.

It is another object of the present invention to provide a fused filament fabrication printer which facilitates the use of multiple printheads to apply different materials.

It is a further object of the present invention to provide a fused filament fabrication printer which can employ printheads which extrude thermoplastic to create the stereolithographic model.

Further objects, features and advantages of the invention will be apparent from the following detailed description when taken in conjunction with the accompanying drawings.

DESCRIPTION OF THE PREFERRED EMBODIMENTS

Figure 1:
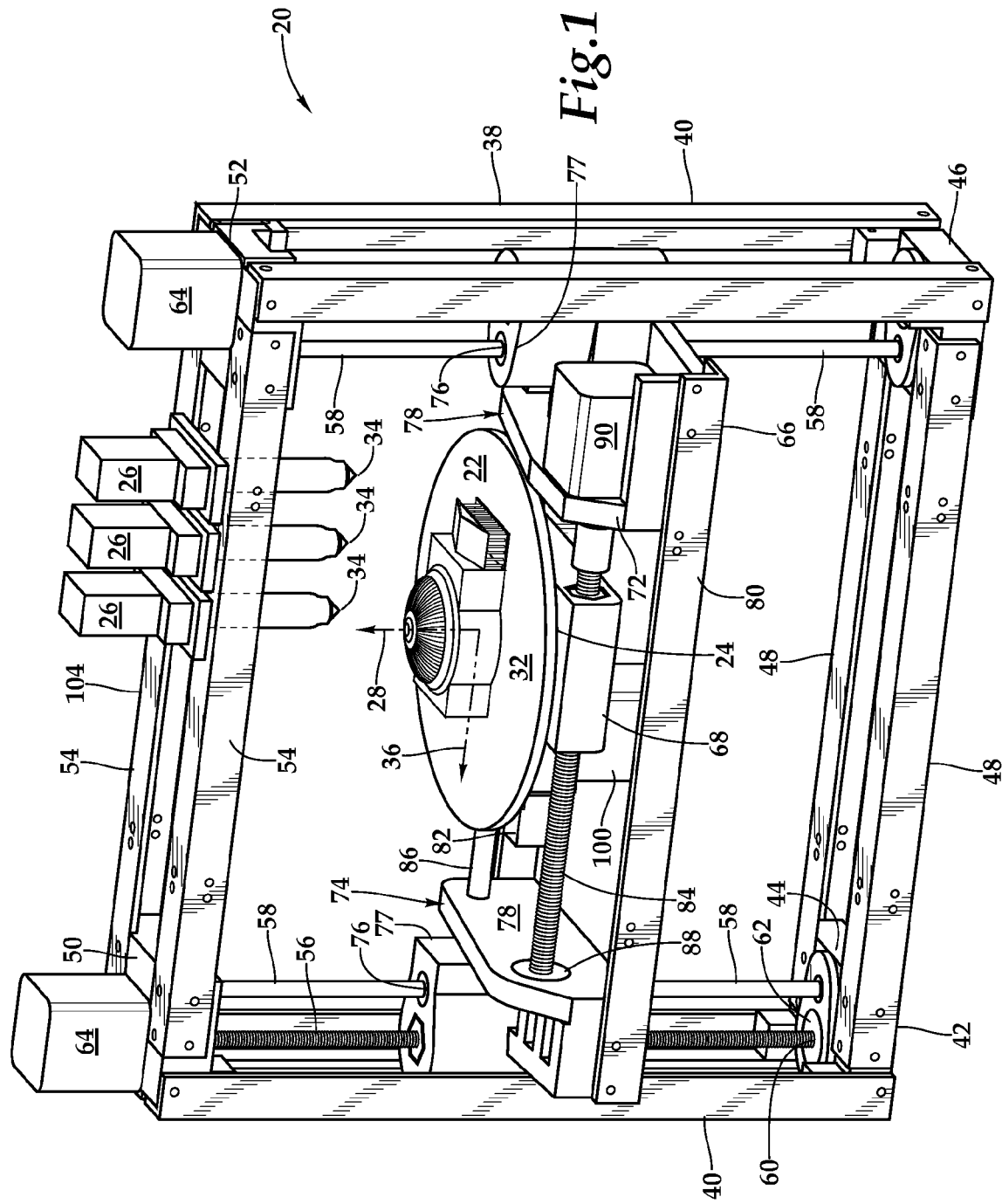
FIG. 1 is a front isometric view of the fused filament fabrication printer of this invention.
Figure 2:
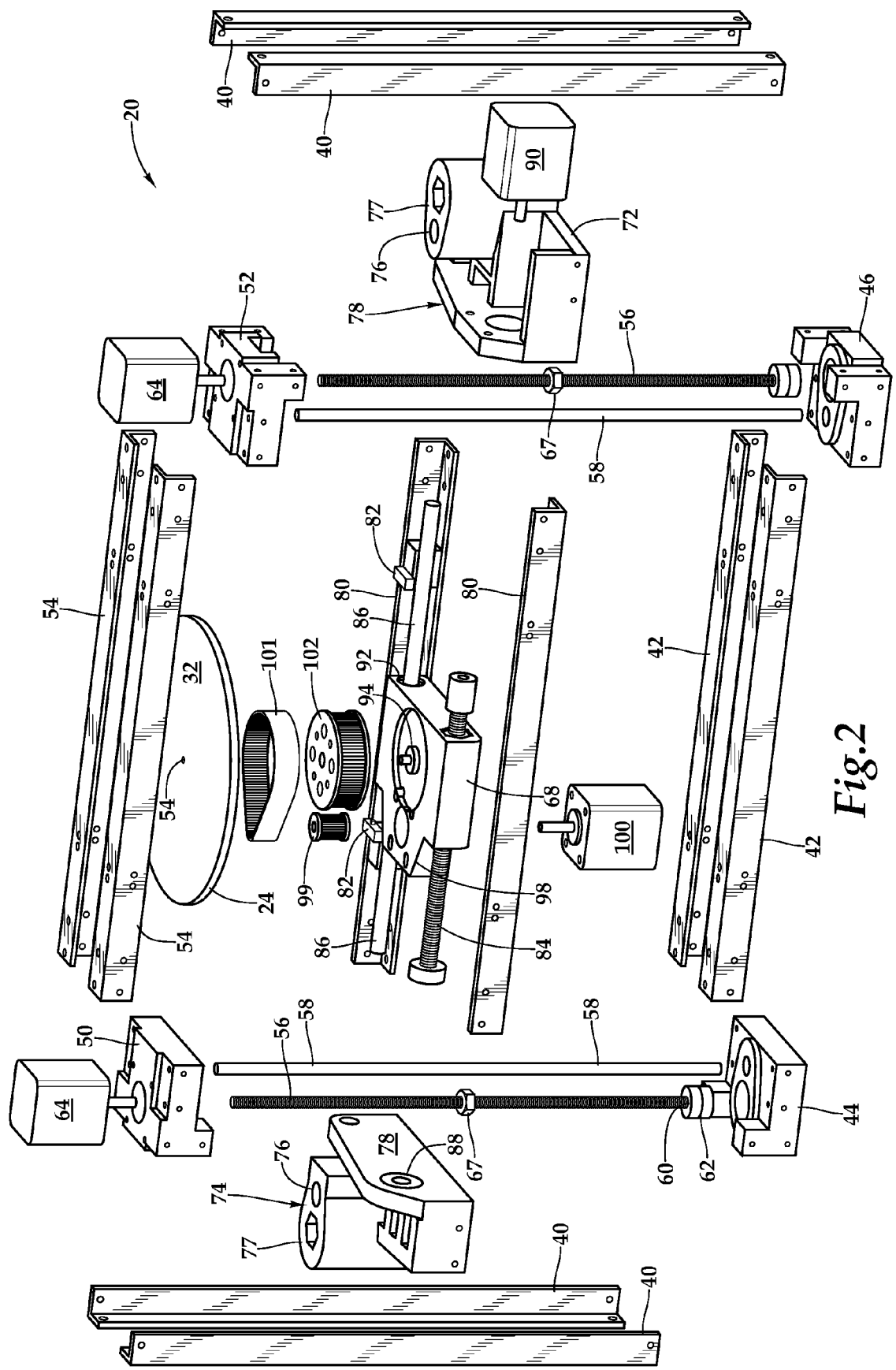
FIG. 2 is an exploded isometric view of the fused filament fabrication printer of FIG. 1.

Referring more particularly to FIGS. 1-4 wherein like numbers refer to similar parts, a fused filament fabrication printer 20 is shown in FIG. 1. The printer 20 provides movement along three degrees of freedom to position various portions 22 of a printer build platform 24 beneath a plurality of printheads 26. The printheads 26 have tips 34 through which thermoplastic polymers, or metals are extruded. The three degrees of freedom start with a first degree of freedom: rotation of the build platform 24. The build platform defines a start-print plane or surface 32. A second degree of freedom is provided by linear motion along a radius or y-axis 36 perpendicular to the z-axis 28. A third degree of freedom is provided by linear motion of the printer platform in a Z-direction along the z-axis 28. The build platform 24 is moved in the Z-direction so the surface 32 occupies parallel planes, each parallel to a plane defined by the tips 34 of the printheads 26.

The indexing of the three degrees of freedom in combination with the controlled turning on and off of the extrusion process in the printhead or printheads generates the printed object or model 31.

As shown in FIG. 1, three degrees of motion can be provided by a comparatively simple structure 38. The structure 38 includes four vertical supports 40 such as the angle irons shown. The supports 40 are mounted to a base 42 comprised of a first pedestal 44 and a second pedestal 46 held in spaced apart array by two lower horizontal supports 48. Two of the vertical supports 40 are mounted to each of the pedestals 44, 46. The vertical supports have upper ends to which are mounted a first motor mounting plate 50, and a second motor mounting plate 52 which are positioned over the pedestals 44, 46 respectively. The motor mounting plates 50, 52 are correspondingly spaced apart by upper horizontal supports 54. Between each of the pedestals 44, 46 and the corresponding overlying motor mounting plates 50, 52 is a lead screw 56 and a cylindrical way rod 58. The way rods 58 extend between the mounting plates 50, 52 and the corresponding underlying pedestals 44, 46, and are fixedly mounted to the plates and the pedestals. The lead screws 56 are mounted at first ends 60 to the pedestals 44, 46 by bearings 62, and are mounted to the overlying mounting plates 50, 52 by stepper motors 64. The motors drive directly or indirectly the lead screws 56.

The build platform 24 is mounted to a cross slide 68 which is arranged on a vertical carriage 66 to provide horizontal motion of the build platform with respect to the vertical carriage. The vertical carriage 66 is mounted to the structure 38 for vertical motion of the build platform with respect to the structure. The vertical carriage 66 has elements described in more detail below, which travel vertically on the lead screws 56 and the cylindrical way rods 58. The carriage 66 is threadedly engaged with the lead screws by the nuts 67 shown in FIG. 2. Simultaneous rotation of the lead screws 56 by the motors 64 causes the vertical carriage 66 to move up or down depending on the direction in which the lead screws are driven by the motors. The lead screws 56 and the cylindrical way rods 58 along which the carriage 66 moves define a Z-direction in the direction of the z-axis 28.

The vertical carriage 66, as shown in FIG. 1, has a right-hand 90° flange 72 and a left-hand 90° flange 74. Each flange 72, 74 has a guide block 77 attached to or forming a part of each flange through which one of the lead screws 56 and one of the cylindrical way rods 58 is mounted. Rotation of the lead screws 56 by the motors 64 drives vertical motion of the flanges 72, 74 and thus the vertical carriage 66. The way rods 58 are captured in vertical bearings 76 so as to allow only vertical motion of the carriage 66. Each mounting element 72, 74 also has vertical flanges 78. The vertical flanges 78 as shown in FIG. 1 face each other so that the flanges 78 are like bookends which are connected by a pair of horizontal carriage supports 80 connected to the mounting elements 72, 74.

Similar to the arrangement whereby the vertical carriage 66 is driven by two lead screws 56 and guided by two way rods 58, the cross slide 68 is driven by a horizontal lead screw 84 and guided by a horizontal cylindrical way 86. The travel of the cross slide 68 is limited by a pair of stops 82 mounted to one of the horizontal carriage supports 80 and function to prevent over travel of the cross slide by micro-switches (not shown) on the stops. The horizontal way 86 is fixedly mounted to each of the flanges 72, 74 while the lead screw 84 is mounted between a bearing 88 in the left-hand flange 74 and a drive motor 90. The drive motor 90 is shown in FIG. 1 mounted to the right-hand flange 72. The cross slide 68 has a linear bearing 92 which is mounted for horizontal motion on the way 86 and is threadedly mounted to the lead screw 84 so the rotation of the lead screw by the motor 90 causes the cross slide 68 to move back and forth in a horizontal direction between the stops 82. A vertical bearing 94 is mounted to the cross slide 68, and the build platform 24 is mounted for rotation about the vertical axis 28. The cross slide 68 incorporates a motor mount bracket 98 to which a motor 100 is mounted. The motor 100 has a toothed sheave 99 which drives a sprocket 102 mounted to the build platform with a timing belt 101. The sprocket 102 mounted in driving relation to the to the build platform rotates on the vertical bearing 94.

The printheads 26 are supported on a printhead mounting fixture 104 formed by the upper horizontal supports 54 between the motor mounting plates 50, 52. Although the printheads 26 are fixed during an operation cycle used to print an object 31 on the fused filament fabrication printer 20, they may be mounted so they can be adjusted between operation cycles.

As shown in FIG. 1, the build platform 24 has a horizontally disposed circular disk which rotates about its central vertical z-axis 28. The build platform 24 is moved back and forth in the horizontal plane by the motion of the cross slide 68, and in the vertical direction by vertical motion of the vertical carriage 66. Combination of these motions can move stepwise or continuously through a print volume defined by the area of the build platform 24 and the vertical height between the printheads 26 and the maximum lower position of the vertical carriage 66, defined by the base 42.

The arrangement of the fused filament fabrication printer 20 wherein the printheads 26 are fixed, the build platform 24 rotates, and the other two degrees of movement are orthogonal linear motion has the advantage that the multiple simultaneously operating printheads are more easily arranged such that printing of 3-D forms 31 is more rapid, and the majority of the motion necessary to print is accomplished by a very robust, and cost effective form of motion: that of rotary motion of the print platform. The non-movement of the printheads 26 means that there is no possibility of interference between printheads because they do not move with respect to each other. Each printhead traces a circle or other predetermined pattern within the print plane, the radius of which depends on the distance between the vertical axis 28 and the location of the printhead 26. The printheads can be lined up along a Y-axis shown by a line 36 in FIG. 1 which passes through the vertical z-axis 28 and extends horizontally in the Y direction defined by the horizontal movement of the cross slide 68.

Figure 3:
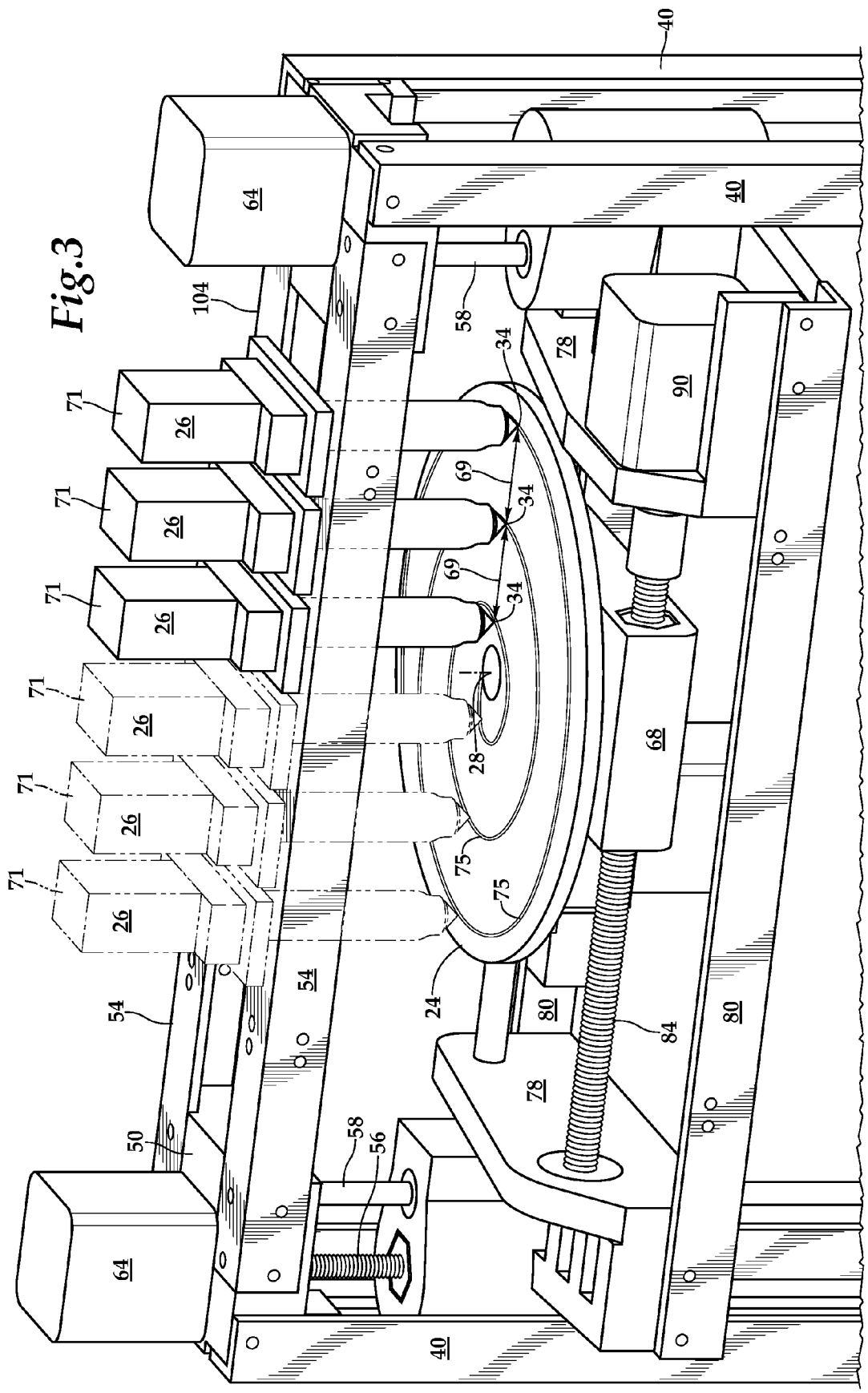
FIG. 3 is a fragmentary isometric view of the printhead mounting fixture, build platform, and a plurality of printheads of the fused filament fabrication printer of this invention.

As shown in FIG. 3, by spacing the printheads 26 along the Y direction line 36 so that the radial line is broken up into a number of equally spaced line segments 69 defined between printheads, an entire print plane layer can be printed with only movement of the build platform 24 by the cross slide 68 along a distance of only a single line segment 69. If models 31 smaller the build platform 24 are made the printheads can be more closely spaced such that the segments 69 are smaller to allow for faster printing of smaller objects. Thus increasing the number of printheads 26 proportionately increases the speed at which a layer of the model is printed. The basic technology of the extrusion process requires a heated nozzle against which a thermoplastic filament 71 is driven by motor (not shown) within the printheads 26. The plastic filament drive motors (not shown) act to control the flow of thermoplastic, thus turning on and off the printing of voxels along the path 75 of the printhead tip 34 as shown in FIG. 3. The design of the printheads involves placing the plastic filament drive motors (not shown) close to the nozzle tips 34 to minimize the flexure of the filament 71 between the motor and the nozzle tip 34 where the filament 71 is converted into flowable thermoplastic which fills the voxels which go to form the print object 31. A relatively high temperature is maintained within the printhead nozzle tips 34 by an electric heater (not shown). The heat of the electric heaters in the nozzle tips 34 must be isolated so it does not soften the filament before it reaches the nozzle tip.

The placement of three additional the printheads 26, as shown in phantom view in FIG. 3, can be used to change the color or material being deposited to form the model 31 so that a single printed object may contain multiple materials or the same material of multiple colors. The method used to determine printhead placement is dependent on the printhead 26 tip 34 orifice size ranging typically from 0.2 to 0.5 mm in diameter. The materials that are extruded from the nozzles are deposited in roughly the same width of material as the nozzle diameters. Using the nozzle or deposit track width as guides, the printheads are located a selected number of nozzle/track widths apart. For example, if the nozzle/effective track width is 0.35 mm, the printheads can be spaced apart approximately 50 track widths or about 17.5 mm. For three printheads 26, as shown in FIGS. 1 and 3, the printheads can be located at:

Printhead(0) located at R=0
Printhead(1) located at R=17.5 mm
Printhead(2) located at R=35 mm In this arrangement, moving the platform 17.15 mm prints over a 52.15 mm radius, and, the time taken to print over the area swept out by the 52.15 mm radius would be equivalent to the time taken for a single printhead to cover an area swept out by a radius of 17.15 mm. Account for material deposited from the outer ½ of the nozzle numbers the area swept out is effectively 52.325 and 17.325 respectively. It is important to note that, as shown in phantom view in FIG. 3, the print heads can be placed on either side of the platform. If six printheads are used on either side of the center of rotation 28 of the printer platform, two materials or two colors can be printed over the same area without an increase in time.

Additionally it is possible to place printheads arranged in a two-dimensional array to further increase print speed or choice of materials.

Figure 4:
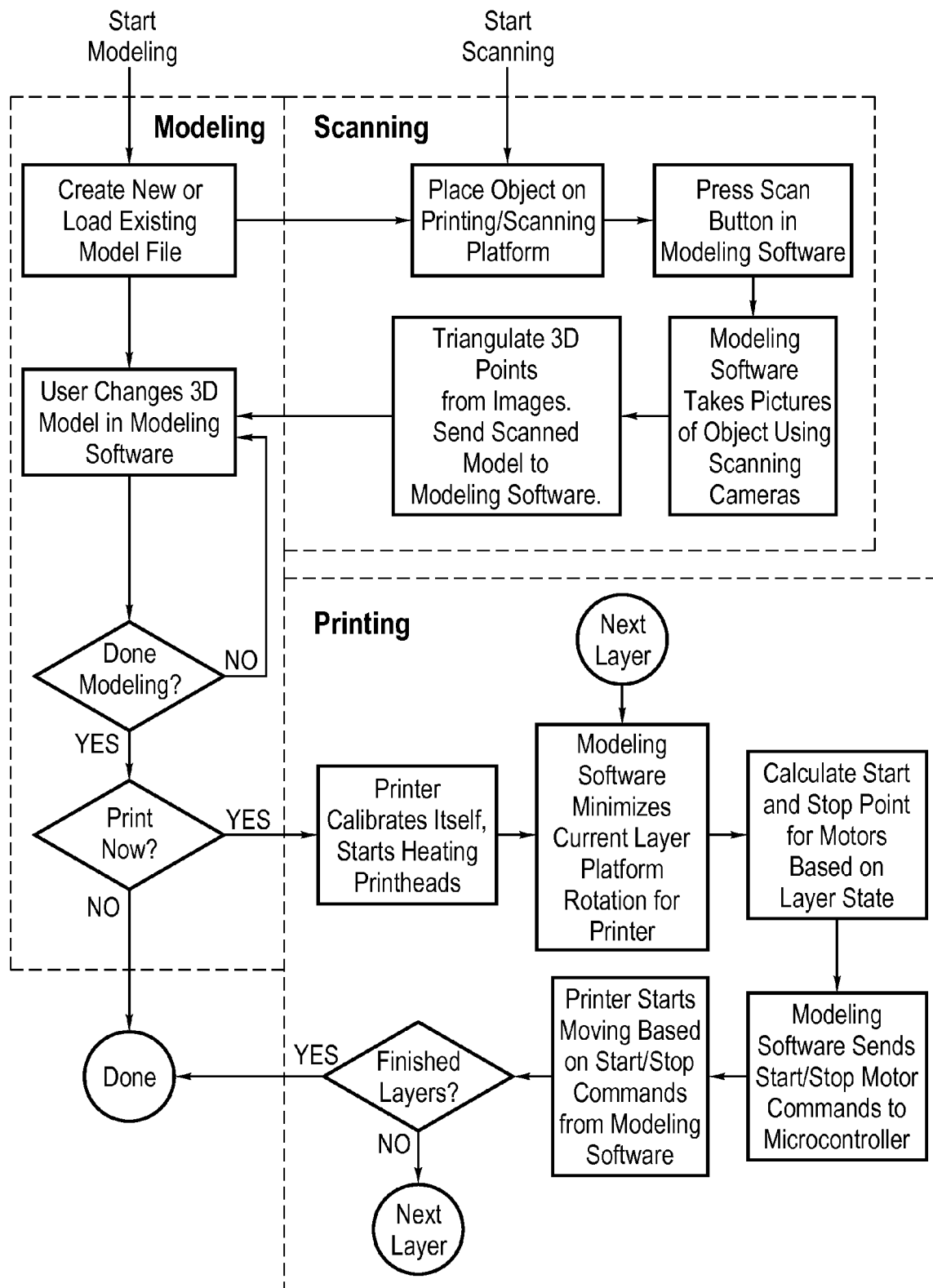
FIG. 4 is a flow diagram of the scanning and printing functions of the fused filament fabrication printer of FIG. 1.

A model 31, such as shown in FIG. 1, is printed by a process illustrated in the flow diagram of FIG. 4. Printing with the fused filament fabrication printer 20 starts with a model which may be created with modeling software such as CAD. Models can also be created by scanning an object using the fused filament fabrication printer 20 as a scan platform by placing the object on the scan platform 24 and having the printer 20 rotate the object, illuminating it with a laser line or light and viewed by one or more cameras (not shown). Image processing software then identifies points on the model and locates them in three dimensions by triangulation from the images, embodied by techniques such as laser line scanning, silhouette scanning, and stereoscopic vision. Once a surface point has been identified and located in three dimensions volume elements lying along the lines from the identified surface point to the cameras are removed from a build volume leaving the model. Such modeling techniques are set forth in "The 3D Model Acquisition Pipeline" Festo Bernard and Holly Rushmeier Vol. 21 (2002) number 2 pp. 149-172 Computer Graphics Forum and "3D Scanning Instruments" Wolfgang Boehler, and Andreas Marbs, i3mainz, Institute for Spatial Information and Surveying Technology, FH Mainz, University of Applied Sciences, Holzstrasse 36, 55116 Mainz, Germany, i3mainz@geoinform.fh-mainz.de both of which are incorporated herein by reference.

The model may then be modified to make solid parts less dense by modifying the track extrusion pattern to make the model less costly and less subject to thermal stresses. The process shown in FIG. 4. illustrates the process where the drive motors 82, 90 and 64 are stepper motors, and printer platform 24 rotation is minimized and start and stop points for the motors and the printheads 26 are calculated and sent to the motor controllers (not shown). The printed object or model is printed one layer at a time as the vertical carriage 66 is incrementally stepped away from the printheads 26, typically in steps of about one third of a millimeter. This can be increased or decreased depending on desired speed and granularity desired in a particular print run.

It should be understood that where motors are described generally stepper motors can be employed. However, particularly to drive the rotation of the build platform, it may be cost-effective and advantageous to use a DC motor with feedback on the rotational position of the build platform 24. Moreover, any of the motors 64, 82, or 90 may be connected to directly drive the corresponding, lead screws 56, print platform 24, or the lead screw 84, or indirectly through gears, timing belts, chains or the equivalent.

It should also be understood that the wide range of materials such as acrylonitrile butadiene styrene (ABS), high-density polyethylene (HDPE), polylactic acid (PLA), and polyvinyl alcohol (PVA), waxes, other thermoplastics, and other multiple substances can be used with the basic printer head technology even to the deposition of metals such as relatively low melting temperature metal, or nano particles in an extrudable matrix.

It should be understood that the fused filament fabrication printer 20 can be operated so that the print object is constructed of polar arcs defined by an angle, a radius, and a plane. Alternatively, because the build platform 24 can be continuously rotated and scanned in the radial direction, the print object can be built up of spirals or involutes of circles. Using several printheads 26 at the same time would allow nested spirals or involutes of circles of two or more arc segments to be used to increase print speed. Further the Z-direction motion could be continuous such that the spirals would be three-dimensional, and the only digital control required would be starting and stopping the flow of material from the printhead while the fused filament fabrication printer 20 scanned through a minimum build volume which encompassed the print object 31. Such an arrangement would eliminate the need for stepper motors except those perhaps associated with extrusion of thermoplastic from the printheads 26.

It should be understood that by controlling drive motors, particularly the motors controlling rotation and translation in the horizontal plane 82 and 90, while simultaneously varying extrusion of thermoplastic from the printhead onto the build platform 24 it is possible to effectively recreate linear movement in a non-cartesian coordinate systems. The rotation of the build platform 24 and horizontal movement of the build platform are controlled together using combinations of alternating micro-stepping sizes and directions. By doing this the local error of each movement are minimize and recreate the linear motion we would need to create outlines of printed objects e.g., the outer shells of objects.

It should be understood that wherein parts are described in the claims as horizontal and vertical or extending in the horizontal and vertical directions it is meant that the parts or directions are substantially perpendicular and not necessary aligned with respect to the earth's gravitational field.

It is understood that the invention is not limited to the particular construction and arrangement of parts herein illustrated and described, but embraces all such modified forms thereof as come within the scope of the following claims.

I claim:

1. A fused filament fabrication printer comprising:
   a frame;
   at least one printhead fixedly mounted to the frame;
   a first carriage mounted to the frame for vertical motion;
   a second carriage mounted to the first carriage for horizontal motion;
   a build platform, having a start-print surface, the build platform rotatably mounted to the second carriage, and positioned opposite the printhead(s), so that as the build platform rotates and moves in a horizontal direction opposite the printhead(s), the printhead(s) scan in a print plane parallel to the start-print surface;
   wherein the first carriage mounted to the frame for vertical motion is arranged to move away from the printhead(s) so that the start-print plane is moved away from the printhead(s).

2. The fused filament fabrication printer of claim 1 further comprising a plurality of printheads mounted to the frame along lines extending through an axis of rotation defined by rotary mounting of the build platform.

3. The fused filament fabrication printer of claim 2 wherein the plurality of printheads mounted to the frame are on a line extending in a horizontal direction defined by the second carriage mounting for horizontal motion.

4. The fused filament fabrication printer of claim 1 further comprising:
   a first motor mounted to the frame and connected in driving relation to the first carriage to cause the first carriage to move in a vertical direction;
   a second motor mounted to the first carriage and connected in driving relation to the second carriage to cause the second carriage to move in a horizontal direction;
   a third motor mounted to the second carriage and connected in driving relation to the build platform to cause the build platform and the start-print surface to rotate on the second carriage.

5. The fused filament fabrication printer of claim 4 wherein the first motor, the second motor, and the third motor are stepper motors, so that motion of the build platform with respect to the printhead(s) is by indexing by selected interval with respect to the printhead(s).

6. The fused filament fabrication printer of claim 4 wherein the first motor and the second motor are stepper motors and the third motor is a direct current motor so that motion of the build platform with respect to the printhead(s) is by indexing by selected interval with respect to the printhead(s) in the vertical and horizontal directions, and continuously in rotation with respect to the printhead(s).

7. The fused filament fabrication printer of claim 4 further comprising:
   two vertical ways mounted spaced apart to the frame, and wherein the first carriage has two spaced apart vertical bearings which slide on the two vertical ways and position the second carriage between the two spaced apart vertical bearings;
   wherein the first motor is connected in driving relation to a vertical machine screw mounted for rotation to the frame, wherein the first carriage is threadedly engaged with the machine screw so as to translate the first carriage in the vertical direction.

8. The fused filament fabrication printer of claim 4 further comprising:
   at least one horizontal way mounted to the first carriage, wherein the second carriage has at least one horizontal bearing which slides on the at least one horizontal way; and
   wherein the second motor mounted to the first carriage and is connected in driving relation a horizontal machine screw mounted for rotation to the first carriage, wherein the build platform is threadedly engaged with the machine screw for translate the build platform in the horizontal direction, when the horizontal machine screw is rotated.

9. The fused filament fabrication printer of claim 4 further comprising a motor mounting bracket mounted to the second carriage, wherein the third motor is mounted to the bracket and has a drive shaft extending parallel to a z-axis, the drive shaft having a tooth drive pulley and connected in driving relation to a sprocket by a timing belt, the build platform being connected to the sprocket to be driven in rotation with the sprocket.

10. A fused filament fabrication printer comprising:
    a frame;
    a first carriage mounted to the frame for vertical motion;
    a second carriage mounted to the first carriage for horizontal motion;
    a build platform having a surface, the build platform rotatably mounted to the second carriage, so that rotation of the build platform defines an axis of rotation;
    a plurality of printheads mounted to the frame along lines extending through the axis of rotation defined by the build platform;
    wherein the build platform is positioned opposite the printheads, so that as the build platform rotates and moves in a horizontal direction opposite the printheads, so that the printheads can print in a print plane parallel to the surface of the build platform, as the build platform is moved relative to the printheads;
    wherein the first carriage mounted to the frame for vertical motion is arranged to move away from the printheads so that the print plane is moved away from the printheads.

11. The fused filament fabrication printer of claim 10 wherein the plurality of printheads mounted to the frame are on a line extending in a horizontal direction defined by the first carriage mounting for horizontal motion.

12. The fused filament fabrication printer of claim 10 wherein the build platform has a build area on which an object can be printed which is defined by a radius extending out from the axis of rotation; and
    wherein motion of the second carriage on the first carriage is limited to a travel length less than the radius defining the build area.

13. The fused filament fabrication printer of claim 10 wherein the printheads are adjustably mounted to the frame for positioning between operation cycles of the fused filament fabrication printer.

14. The fused filament fabrication printer of claim 10 wherein the printheads are mounted to the frame on opposite sides of the axis of rotation.

15. The fused filament fabrication printer of claim 14 wherein the printheads are each connected to a supply of material for extruding onto the build platform, and wherein the printheads mounted to the frame on opposite sides of the axis of rotation are connected to supplies of different materials for extruding onto the build platform.

* * * * *